US012676043B2

(12) United States Patent
Rozenfeld et al.

(10) Patent No.: US 12,676,043 B2
(45) **Date of Patent: *Jul. 7, 2026**

(54) CARD PROCESSING AND ATTACHING SYSTEM

(71) Applicant: DMT Solutions Global Corporation, Danbury, CT (US)

(72) Inventors: Boris Rozenfeld, Danbury, CT (US); Anthony E. Yap, Palmyra, PA (US); George Cruz, Stratford, CT (US); John Robert Masotta, Newtown, CT (US); Craig D. Richard, Kinderhook, NY (US); Robert J. Allen, Shelton, CT (US); Eddy Edel, New Milford, CT (US)

(73) Assignee: DMT Solutions Global Corporation, Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/037,988

(22) Filed: Jan. 27, 2025

(65) Prior Publication Data

US 2025/0174068 A1 May 29, 2025

Related U.S. Application Data

(62) Division of application No. 17/990,432, filed on Nov. 18, 2022, now Pat. No. 12,211,355.

(60) Provisional application No. 63/280,759, filed on Nov. 18, 2021.

(51) Int. Cl.
*G07F 7/08* (2006.01)
*G09F 3/10* (2006.01)

(52) U.S. Cl.
CPC ................ *G07F 7/084* (2013.01); *G09F 3/10* (2013.01)

(58) Field of Classification Search
CPC ........... G07F 7/084; G09F 3/10; B65H 29/62; B65H 37/04; B65H 43/04; B65H 2301/34112; B65H 2301/5161; B65H 2701/1914; B65H 2801/66; B65H 39/06
See application file for complete search history.

(56) References Cited

U.S. PATENT DOCUMENTS

| | | | | |
|---|---|---|---|---|
| 5,701,727 A * | 12/1997 | Lundstrom | ............ | B65H 45/12 53/284.3 |
| 6,687,569 B1 | 2/2004 | Skinger et al. | | |
| 6,687,570 B1 | 2/2004 | Sussmeier et al. | | |
| 7,328,897 B2 * | 2/2008 | Bryant | .................. | B65H 29/58 235/475 |

(Continued)

FOREIGN PATENT DOCUMENTS

| | | |
|---|---|---|
| EP | 1846872 A2 | 10/2007 |
| WO | 96/25294 A1 | 8/1996 |

*Primary Examiner* — Matthew Mikels
(74) *Attorney, Agent, or Firm* — Brown Rudnick LLP; Matthew P. York

(57) ABSTRACT

The invention is a modular card processing and attaching system configured to provide uninterrupted workflow in the feeding and subsequent attaching of cards to carriers for the formation of a mailpiece. The modular card processing and attaching system is further configured to be incorporated into a production mail inserter system, such that attached card and carrier mailpieces may be subsequently sorted and/or inserted into a mailable envelope or packages to be mailed.

20 Claims, 13 Drawing Sheets

(56) References Cited

U.S. PATENT DOCUMENTS

| | | | | |
|---|---|---|---|---|
| 9,573,709 | B2 | 2/2017 | Chapman et al. | |
| 12,211,355 | B2 * | 1/2025 | Rozenfeld | G07F 7/084 |

* cited by examiner

CARD PROCESSING AND ATTACHING SYSTEM

CROSS-REFERENCE TO RELATED APPLICATIONS

This application is a divisional of U.S. patent application Ser. No. 17/990,432, filed Nov. 18, 2022, which claims priority to, and the benefit of, U.S. Provisional Application No. 63/280,759, filed Nov. 18, 2021, the content of each of which is incorporated by reference herein in their entireties.

TECHNICAL FIELD

The present disclosure relates generally to mailpiece fabrication systems, and, more particularly, to a modular card processing and attaching system configured to provide uninterrupted workflow in the feeding and subsequent attaching of cards to carriers for the formation of a mailpiece.

BACKGROUND

Direct mail is an important tool for businesses to communicate with customers. Many businesses have a need to distribute cards, such as payment cards, identification cards, or membership cards to individuals by mail. The cards may be personalized or combined with other inserts or mailer components, and the entire package (i.e., mailpiece) must be addressed to the appropriate recipient, all of which makes the preparation of such mailers very labor-intensive and demanding.

As such, many businesses turn to mailpiece fabrication systems, such as mailpiece preparation and finishing systems, to increase efficiency by automating the printing, folding, and insertion processes. For example, card attaching systems may typically be used by organizations to periodically produce a large volume of cards in carriers for mailings (e.g., gift cards, loyalty cards, healthcare cards, credit and debit cards, unemployment benefit cards, driver's licenses, and more). However, with conventional card attaching systems, the printing on cards and attaching the printed cards to carriers is a multi-step process that, in many cases, is performed in separate workflows, which can have drawbacks.

For example, relying on separate workflows in creating each card negatively impacts productivity by adding inefficiencies with each module of a given system. In particular, an error presented by any given module requires that an operator manually handle such error, thereby introducing integrity issues. Furthermore, fixing such errors is not only time consuming, but is highly disruptive to the throughput of cards through a single assembly. For example, a typical assembly may require that the cards must first be printed, then validated, and then fed through an attaching system in order to separately identify errors at each given step of the workflow. As such, the separate workflows in creating the given mailpiece negatively impacts productivity, brings added inefficiencies, and requires additional handling that can introduce integrity issues to the process.

SUMMARY

The present invention relates to a card processing and attaching system configured to provide feeding and subsequent attaching of cards to carriers for the formation of a mailpiece. In particular, the card processing and attaching system comprises various modules operably coupled to one another to form a single uninterrupted workflow for processing and subsequently attaching cards to carriers. The workflow process comprises a single assembly in which cards flow through each module of the system without interruption.

The system may generally include a plurality of individual modules operably coupled to one another and configured to provide different respective functions in the workflow. Such functions may include, but are not limited to, feeding cards into the system along a card input pathway, printing information on the cards, curing the printed cards, buffering cards, scanning cards, and subsequently processing and transporting the cards to a card placement mechanism configured to position one or more cards relative to a carrier and subsequently placing the one or more cards onto the carrier which is presented below in a separate flow path. As such, depending on the need of a given project, the modularity of the system allows for the addition or subtraction of modules without impacting the overall performance of the system.

By combining many of the above-mentioned functions into a single system, the overall throughput and mailpiece integrity are improved, while errors and system inefficiencies are reduced. Furthermore, the card processing and attaching system of the present invention is configured to be incorporated into a production mail inserter system, such that attached card and carrier mailpieces may be subsequently sorted and/or inserted into a mailable envelope or packages to be mailed.

The system of the present invention may generally include a card feeder module configured to receive and feed a plurality of cards in a first direction (referred to herein as a card input or flow path). In particular, in some embodiments, the card feeder module may generally be configured to receive and retain a stack of a plurality of cards to be subsequently fed one at a time into the card input pathway in a singulated fashion and in a first direction. It should be noted that the cards may already include printed information thereon, or, in some instances, the cards may be blank and may require printing of information, which can occur downstream via a card printing module, as described in greater detail herein.

The plurality of cards are eventually passed along to a card placement module for positioning and placing of one or more cards onto a carrier. For example, in one embodiment, the card placement module may include a Right Angle Turn (RAT) attachment module. In such an embodiment, cards may generally be diverted to flow in a second direction (i.e., diverted at a right angle turn) to be perpendicular to the initial card flow direction. The second direction is generally parallel to a direction of flow of card carriers from a card carrier transport module. In particular, a plurality of card carriers may be transported in the second direction using vacuum belts, which allow for an open architecture and complete exposure to the top of the carrier relative to the RAT attachment module. Accordingly, such a configuration allows for scanning, printing, and application of an adhesive (i.e., tape or glue) to the carriers, and subsequent attaching of cards to the carriers without overhead transport nips interfering with the process. For example, as a given carrier is transported along the vacuum belts, adhesive (in the form of glue or tape) may be applied just prior to card placement, and card(s) are then attached to the given carrier via the RAT attachment module, in which card(s) may be tipped into placement (i.e., placed on the adhesive on the carrier by merging the card with the carrier at speed).

In another embodiment, the card placement module may include pick and place (PNP) attachment module. In particular, cards may be attached to carriers via the PNP attachment module without first diverting the cards in the second direction, as would occur with the RAT attachment module. For example, the PNP attachment module generally includes a frame for supporting a moveable carriage comprising sets of suction cups configured to lift and release one or more cards at a time for subsequent positioning and placement of the cards onto carriers. In particular, the PNP attachment module is mounted relative to the card carrier transport module, such that carriers are transported and flow underneath the carriage of the PNP module. The carriage can be moved horizontally and vertically relative to carriers via independently controlled actuators of the PNP attachment module. Accordingly, the PNP attachment module may use suction, from suction cups or a low-strength vacuum, to pick up one or more cards from the card stream, then move in a horizontal direction to align the one or more cards with a given carrier and move in a vertical direction to place the one or more aligned cards onto a carrier at speed.

It should be noted that either embodiment of the card placement module (i.e., RAT attachment module and PNP attachment module) provides card placement flexibility. In particular, the system of the present invention allows for varying the number and location of cards on a carrier without interrupting the card flow.

In some embodiments, the system may further include a card printer module configured to receive cards from the card feeder module. The card printer module may generally include belt assembly for retaining and moving cards along the card flow path at a desired speed, such as a vacuum transport belt or the like. The cards are flowed through a printer configured to print information on the cards. Any known printer may be used. For example, in some embodiments, the printer may be an ultraviolet (UV) curable ink printer, and, as such, the card printer module may further include an ink curing module comprising a UV light.

Work in process (WIP) can be understood to be a number of cards, or any type of document, being processed by the system at any given time. In order to meet productivity requirements, the cards are fed at a specific rate and pitch. Given the length of the transport through the card printer module and subsequent modules, this places many cards in process at a given time. One important goal of this system is to maximize the amount of WIP while still being able to handle unexpected issues on the system. For example, if too many cards/documents are in process when the system needs to stop, there can be an overrun or pile up of cards/documents, resulting in the system losing track of them. Traditionally, this issue was solved by having a certain amount of parking positions or spots (also referred to as stopping positions or stops) per amount of WIP required. Such parking positions are created by adding an additional motor and (e.g., belt, roller, and/or nips) that can be controlled independently from the rest of the system. However, parking positions take up length and add costs to the overall system and process.

In order to effectively manage the WIP, without adding multiple parking positions, the system of the present invention further includes a refeed buffer module. The refeed buffer module is configured to receive printed and cured cards from the card printer module and essentially functions by stacking the cards vertically, and then re-feeding them back out for subsequent processing. Accordingly, during an unexpected stop of the system, upstream cards can be stacked in a hopper associated with the refeed buffer module. As such, the refeed buffer module is similar to the card feeder module, in that cards are singulated from a stack of cards. However, the card stack size in the refeed buffer module is much smaller than the initial loaded card stack in the hopper of the feeder module, and under normal steady state operation, the refeed buffer module is configured to maintain a constant number of cards at a given time.

Accordingly, the refeed buffer module is unique in that, during steady state operation, the refeed buffer module is able to acts as single nip/gate transport, and thus does not take up much length or space, but, during exception conditions, such as input latencies and complete stoppages, the WIP can be placed in the refeed buffer module hopper and refed back into the workflow upon resumed operation, thereby effectively managing the WIP. The alternative for holding an equivalent amount of cards would be to provide individual parking positions along the card path, which requires a longer card path, which can present system timing and floor space challenges.

As previously described, the cards may either already have printed information thereon, or a card printer module may be included in the system. Advantageously, the printed information may include information regarding a corresponding carrier for a given card. The information on the card, including the information regarding the corresponding carrier, may be scanned in real-time at a scan station module. Not only does this step allow for the corresponding carrier to be identified (which may be useful when attaching the cards to corresponding carriers), but the scanned information may also used to automatically remove cards printed with errors from the card flow, in real-time, without interrupting the card flow. For example, if a card is determined to be out of sequence or has errors, the card can be out sorted off the end of a card leg at card out sort module and may be moved to divert bin, for example.

Aspects of the invention may further comprise additional modules for performing certain functions, including pre-attachment and post-attachment functions. For example, the system of the present invention may include a module for applying labels to cards prior to attachment of the cards to carriers. The labels may be directly applied to the cards and provide information related to the card (i.e., security information, instructions for activating a card, or the like). Regarding post-attachment functions, the system may further include as a step of automatically analyzing a card-carrier attachment to validate whether each card is attached to the correct corresponding carrier. Moreover, post-attachment validation functions may be used to automatically analyze multiple card-carrier attachments simultaneously.

Accordingly, the system of the present invention provides numerous advantages. For example, by operably coupling a plurality of individual modules to one another, each having a specific function, a single system is achieved, thereby improving the overall throughput and mailpiece integrity, while reducing errors and system inefficiencies. Such modules provide various functions in the workflow, and associated benefits, including, but not limited to, controlled feeding of cards into the system via a card input path, printing on said cards, buffering said cards to handle errors without the need to necessarily stop the system workflow, scanning of cards for authentication purposes and to identify errors, and subsequent positioning and placing of cards onto respective carriers. Furthermore, the modularity of the system allows for the addition and subtraction of certain modules as an operator sees fit without necessarily impacting the overall system performance.

BRIEF DESCRIPTION OF THE DRAWINGS

Features and advantages of the claimed subject matter will be apparent from the following detailed description of embodiments consistent therewith, which description should be considered with reference to the accompanying drawings.

FIG. 1 is a block diagram schematic of an exemplary production mail inserter system in which the card processing and attaching system of the present invention can be operably coupled to.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present invention is directed to a card processing and attaching system. In particular, the card processing and attaching system comprises various modules operably coupled to one another to form a single uninterrupted workflow for processing and subsequently attaching cards to carriers. The workflow process comprises a single assembly in which cards flow through each module of the system without interruption.

The system may generally include a plurality of individual modules operably coupled to one another and configured to provide different respective functions in the workflow. Such functions may include, but are not limited to, feeding cards into the system along a card input pathway, printing information on the cards, curing the printed cards, buffering cards, scanning cards, and subsequently processing and transporting the cards to a card placement mechanism configured to position one or more cards relative to a carrier and subsequently placing the one or more cards onto the carrier which is presented below in a separate flow path. By combining many of the above-mentioned functions into a single system, the overall throughput and mailpiece integrity are improved, while errors and system inefficiencies are reduced. Furthermore, the card processing and attaching system of the present invention is configured to be incorporated into a production mail inserter system, such that attached card and carrier mailpieces may be subsequently sorted and/or inserted into a mailable envelope or packages to be mailed.

As described in greater detail herein, the unique card processing and attaching system can be incorporated into a production mail inserter system. For example, the system of the present invention can be used to process and attach cards to carriers, at which point, the inserter system can be used to then insert the carriers into an envelope or other package for mailing. Inserter systems are automated or semi-automated machines that prepare mailers and may include document production modules, document handling applications, and finishing applications. For example, the card processing and attaching system can be incorporated into, or otherwise operably associated with, modular inserter platforms, including, but not limited to, any one of the EVOLUTION™, MAILSTREAM EVOLUTION™, RIVAL™, and EPIC™ inserter platforms available from DMT Solutions Global Corporation dba BlueCrest (Danbury, CT).

Figure 1:
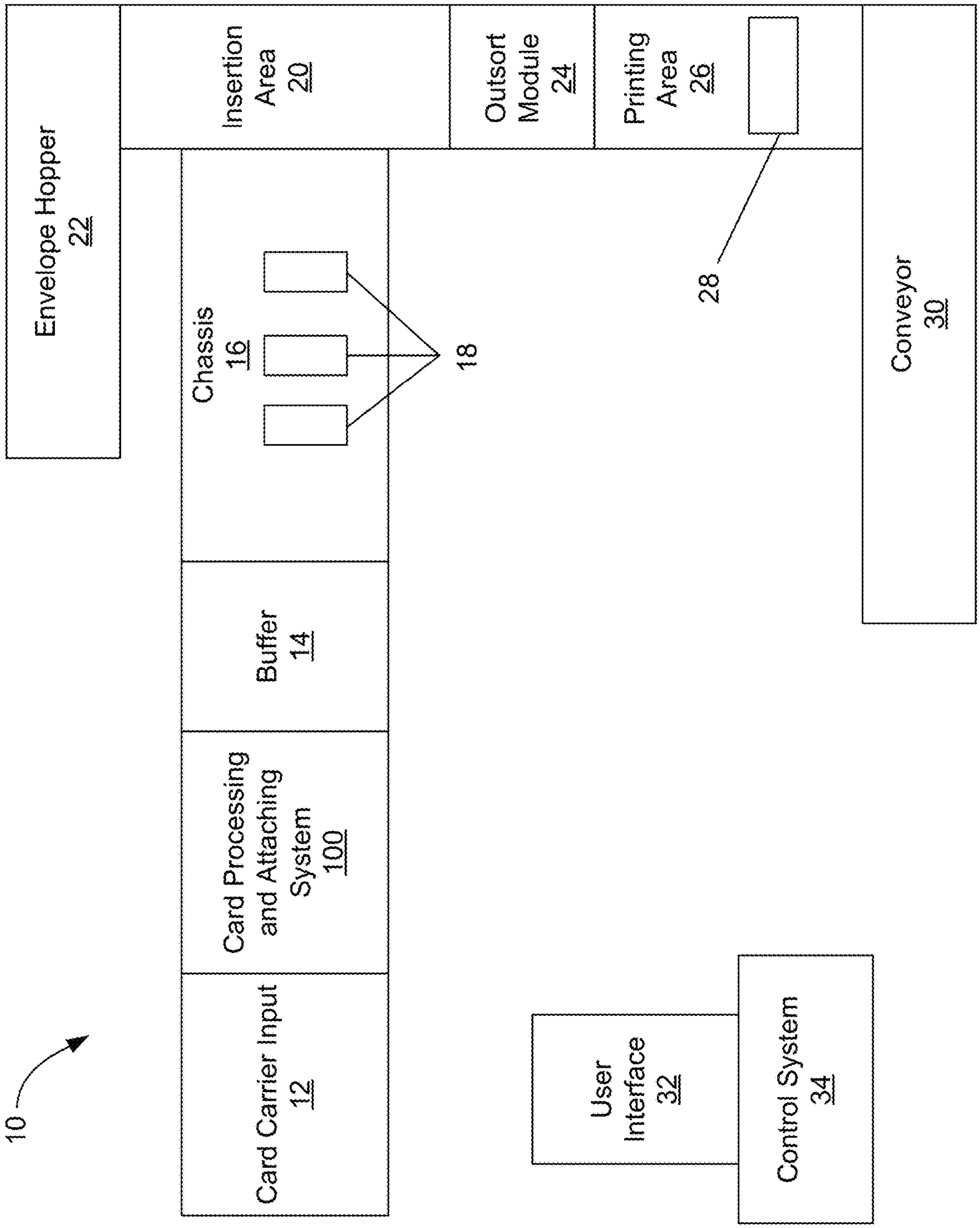

FIG. 1 is a block diagram schematic of an exemplary production mail inserter system 10 in which the card processing and attaching system 100 of the present invention can be operably coupled to. The inserter system 10 has several modules for accomplishing different tasks in the mail preparation process. The various modules may be controlled by a computer and controller, as will be described in greater detail below. The inserter system 10 as shown in exemplary and other compatible inserters may include different combinations and configurations of the various modules.

In direct mailing, it is desirable to prepare a mailer that contains a paper carrier with one or more cards attached. Generally, to process such a mailer, a paper carrier is prepared, which includes printing the carrier with desired information, and then attaching one or more cards thereto. The cards are often made of a more rigid material than the paper carrier, such as a thicker paper, cardboard, plastic, metal, or a polymer material. The carrier with the attached card is typically folded (although not always), and optionally combined with one or more other inserts or materials, before being inserted into an envelope for mailing.

As shown, the inserter system 10 may include a card carrier input module 12, configured to feed carriers to the card processing and attaching system 100. In different embodiments, the carriers may be pre-printed or blank.

Optionally information may be printed on the documents via a printing module (not shown) prior to being transferred to the card processing and attaching system 100. The carriers can be half folded, tri folded, or flat sheets and have the option of being folded before or after the cards are attached. The carriers may be provided by the card carrier input module 12 as individual cut sheets, or may be cut from a spool using a web cutter (not shown).

The carriers next move to the card processing and attaching system 100, where cards are attached to the carriers. As will be described in greater detail herein, card processing and attaching system 100 comprises various modules operably coupled to one another to form a single uninterrupted workflow for the printing and subsequent attaching of cards to carriers. The workflow process comprises a single assembly in which cards flow through each module of the system without interruption. For example, the various modules allows for cards to be printed, cured, buffered, scanned, processed and transported into a card placement mechanism for positioning one or more cards relative to a carrier and subsequently placing the one or more cards onto a carrier which is presented below one or more associated cards in a separate flow path. It should further be noted that the card processing and attaching system 100 may be configured to read information on the carriers, print cards from a stack of pre-embossed cards to be attached to respective carriers, and subsequently attach the printed cards to the carriers at one or more locations on the carriers.

The carriers (with cards attached) next move to a buffer 14, which holds the carriers for sequential processing. The carriers next move to a chassis 16, where inserts from a plurality of feeder modules 18 may be added to the carriers. The carriers next enter an insertion area 20, where the finished carriers are stuffed into envelopes provided by an envelope hopper 22, and the envelopes are sealed. The stuffed, sealed envelopes then enter an outsort module 24, for optionally diverting defective envelopes from the production stream into a reject bin (not shown). Defective envelopes may have carriers that are improperly assembled and/or cards that are detached or damaged and/or may be improperly sealed, for example.

The properly assembled and sealed envelopes next enter a metering and printing area 26, where markings, such as a postage indicia and/or address information, for example, are applied using a printer 28 to form completed mail pieces. Finally, the completed mail pieces are deposited on a conveyor 30.

The system 10 can be monitored and controlled via a user interface 32, which may be physically attached to the system or may be located remotely and operably coupled to a control system 34. The user interface 32 can include a screen configured to display operating conditions and parameters of the inserter system 10 to a user. For example, the user interface 32 may display parameters and operating conditions of the various modules and allow a user to control the functioning or one or more modules and switch between jobs as needed. The user interface 32 can include a touch-screen or the like, as well as other input devices such as a keyboard/keypad or a mouse. The control system 34 includes a processor configured to execute instructions that control the processing of material (i.e., inserts, carriers, cards, envelopes, etc.) in the various stations of the inserter system 10.

Other systems utilizing more or fewer components and/or different arrangements of components may also be used. It should also be understood that the improvements described in this application can also be used as a stand-alone card printer and attaching system and there is no need for the system to be part of a larger production system.

Figure 2:
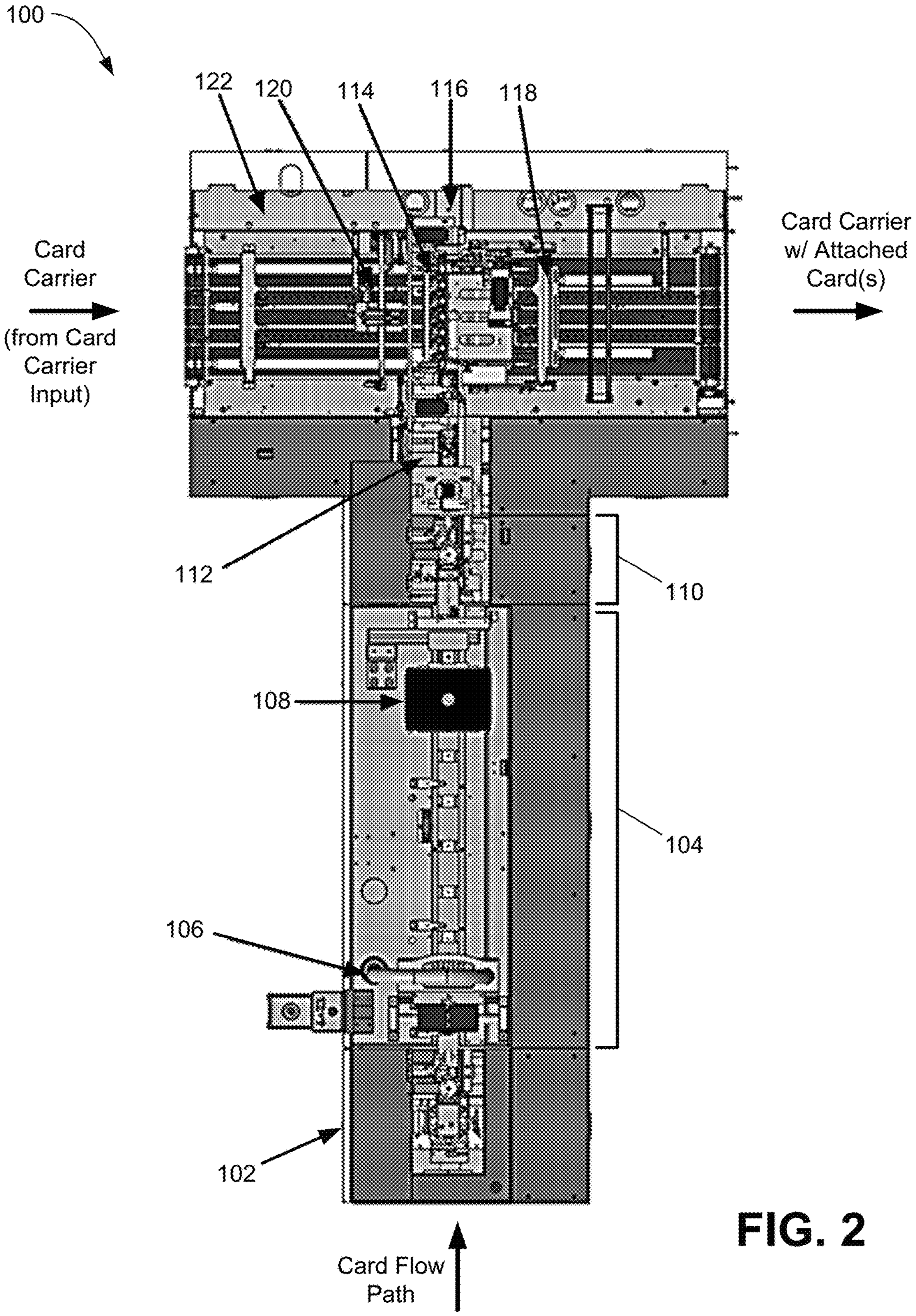
FIG. 2 is a plan view of the card processing and attaching system of the present invention illustrating various modules operably coupled to one another.
Figure 3:
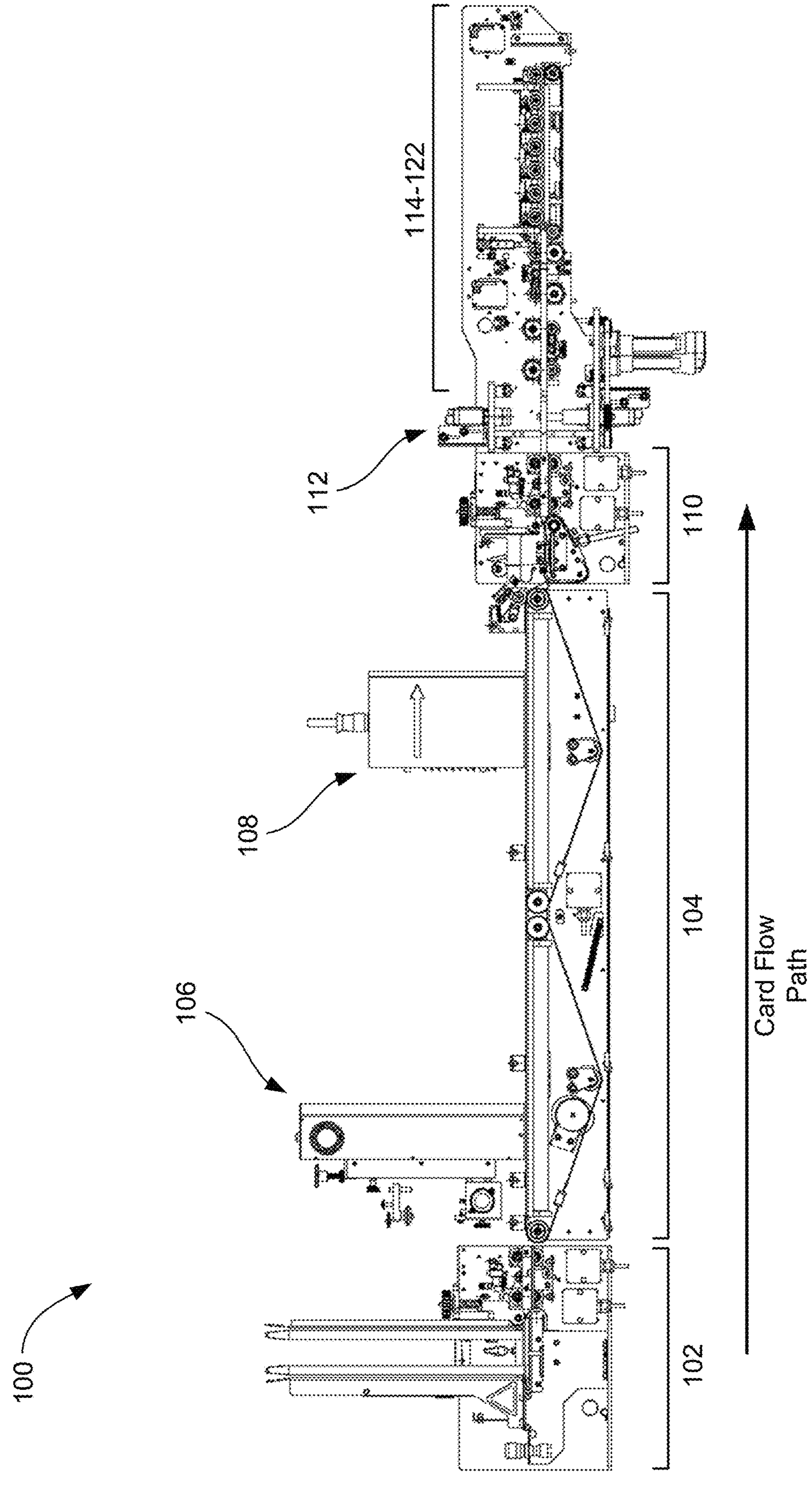
FIG. 3 is a side view of the card processing and attaching system of the present invention illustrating various modules operably coupled to one another.
Figure 4:
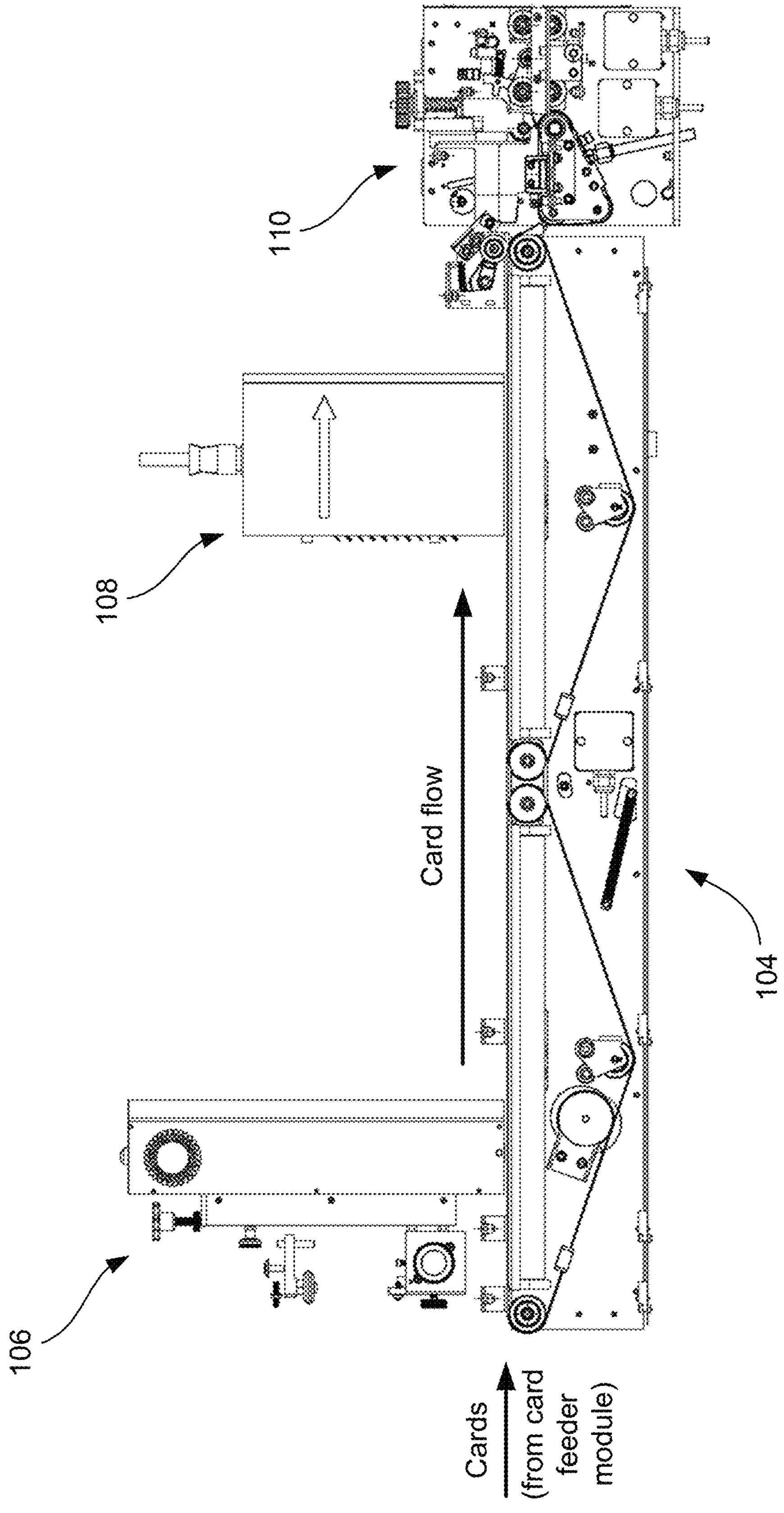
FIG. 4 is a side view of a card printer module operably coupled to a refeed buffer module in greater detail.

FIGS. 2 and 3 are plan and side views, respectively, of the card processing and attaching system 100 of the present invention illustrating various modules operably coupled to one another.

As shown, the system 100 includes a plurality of individual modules operably coupled to one another and configured to provide various functions in the workflow. Such functions may include, but are not limited to, feeding cards into the system along a card input pathway, printing information on the cards, curing the printed cards, buffering cards, scanning cards, and subsequently processing and transporting the cards to a card placement mechanism configured to position one or more cards relative to a carrier and subsequently placing the one or more cards onto the carrier which is presented below in a separate flow path. As such, depending on the need of a given project, the modularity of the system allows for the addition or subtraction of modules without impacting the overall performance of the system.

For example, system 100 includes a card feeder module 102 configured to receive and feed a plurality of cards in a first direction (referred to herein as a card input or flow path). The cards to be processed may be placed in the card feeder module 102 to be singulated and fed into the system. The cards can be made of paper stock, plastic, or metal and may contain a printable area for the application of an ink. In particular, in some embodiments, the card feeder module 102 may generally be configured to receive and retain a stack of a plurality of cards to be subsequently fed one at a time into the card input pathway in a singulated fashion and in a first direction. The cards may be fed into the system short edge first. However, it should be noted that, in some embodiments, the cards may be fed into the system long edge first.

It should be noted that the cards may already include printed information thereon, or, in some instances, the cards may be blank and may require printing of information, which can occur downstream via a card printing module 104. For example, as shown, the system 100 may include a card printer module 104 configured to receive cards from the card feeder module 102. The card printer module 104 may generally include belt assembly (i.e., a vacuum transport belt or the like) for retaining and moving cards along the card flow path at a desired speed. The cards are flowed through a printer 106 configured to print information on the cards. Any known printer may be used. For example, in some embodiments, the printer may be a UV curable ink printer, and, as such, the card printer module 104 may further include an ink curing module 108 comprising a UV light for curing the ink upon being exposed to the UV light.

As shown, the system 100 may further include a refeed buffer module 110 in order to effectively manage work in process (WIP). For example, the cards may be fed through the assembly at a specific rate and pitch. Given the length of the transport, this allows any number of cards to be in process at a given time. While the WIP may be managed by providing stopping spots for exception conditions, such as input latencies and complete stoppages, the refeed buffer module 110 is configured to receive printed and cured cards from the card printer module 104 during an unexpected stoppage, essentially stacking the cards vertically within an associated hopper, and then re-feeding them back out for subsequent processing upon resuming operation. As such, the refeed buffer module 110 is similar to the card feeder module 102, in that cards are singulated from a stack of cards. However, the card stack size in the refeed buffer module is much smaller than the initial loaded card stack in the hopper of the feeder module 102, and under normal steady state operation, the refeed buffer module is configured to maintain a constant number of cards at a given time.

Accordingly, the refeed buffer module 110 is unique in that, during steady state operation, the refeed buffer module 110 is able to acts as single nip/gate transport, and thus does not take up much length or space, but, during exception conditions, such as input latencies and complete stoppages, the WIP can be placed in the refeed buffer module hopper and re-fed back into the workflow upon resumed operation, thereby effectively managing the WIP. The alternative for holding an equivalent amount of cards would be to provide individual parking positions along the card path, which requires a longer card path, which can present system timing and floor space challenges.

The system 100 may also include a scan station module 112. For example, as previously described, the cards may either already have printed information thereon, or a card printer module 104 may be included in the system. Advantageously, the printed information may include information regarding a corresponding carrier for a given card. The information on the card, including the information regarding the corresponding carrier, may be scanned in real-time at the scan station module 112.

For example, cards may pass through the scan station module 112 where they can be either top- or bottom-scanned to determine whether the printed information matches to a carrier or to validate the information printed on a given card. Not only does this step allow for the corresponding carrier to be identified (for use in attaching the cards to corresponding carriers, as described in greater detail below), but the scanned information is also used to automatically remove cards printed with errors from the card flow, in real-time, without interrupting the card flow. For example, if a card is determined to be out of sequence or has errors, the card can be out sorted off the end of a card leg at card out sort module 116 and may be moved to divert bin, for example.

The plurality of cards are eventually passed along to a card placement module 114 for positioning and placing of one or more cards onto a carrier.

As shown in FIG. 2, the cards may be fed from the card feeder module 102 and ultimately to the card placement module 114 in a first direction (i.e., the card flow path). Again, as previously noted herein, additional modules may be included within the card flow path, including, but not limited to, the card printer module 104, the refeed buffer module 110, and/or the scanning station module 112. However, in some embodiments, the system 100 may simply include the card feeder module 102 feeding cards directly to the card placement module 114.

Upon reaching the card placement module 114, the cards must then be positioned relative to and subsequently placed upon associated carriers that are traveling in a second direction (i.e., the card carrier flow path), which may be substantially orthogonal to the card flow path. For example, the system may include a card carrier transport module 122 configured to receive carriers from the card carrier input 12, for example, and subsequently transfer a plurality of carriers along the carrier flow path and relative to the card placement module 114. The card carrier transport module 122 may use vacuum belts, which allow for an open architecture and complete exposure to the top of the carrier relative to the card placement module 114.

Accordingly, such a configuration allows for one or more of scanning, printing, and/or application of adhesive to the carriers prior to attachment of the cards without overhead transport nips interfering with the process. For example, as a given carrier is transported along the vacuum belts, an adhesive may be applied via an adhesive application module 120, just prior to the card placement module 114, and card(s) are then attached to the given carrier via the card placement module 114. The adhesive may include any known adhesive to provide secure engagement between the carrier surface and cards placed thereupon. For example, the adhesive may include glue or adhesive tape, for example.

FIGS. 2 and 3 illustrate one embodiment of a card placement module 114. In particular, FIGS. 2 and 3 show a Right Angle Turn (RAT) attachment module 114. In such an embodiment, scanned cards are diverted to flow in a second direction (i.e., diverted at a right angle turn) to be perpendicular to the first card flow direction. The second direction is generally parallel to a direction of flow of card carriers from the card carrier transport module 122. Accordingly, as a given carrier is transported along the vacuum belts, adhesive may be applied just prior to card placement, and card(s) are then attached to the given carrier via the RAT attachment module, in which card(s) may be tipped into placement (i.e., placed on the adhesive on the carrier by merging the card with the carrier at speed), illustrated at arrow 118. It should be noted that, in other embodiments, the card placement module may include a pick and place (PNP) attachment module in place of a RAT attachment module, as will be described in greater detail herein with respect to FIGS. 8, 9, 10A, 10B, and 11.

Aspects of the invention may further comprise additional modules for performing certain functions, including pre-attachment and post-attachment functions. For example, the system of the present invention may include a module for applying labels to cards prior to attachment of the cards to carriers. The labels may be directly applied to the cards and provide information related to the card (i.e., security information, instructions for activating a card, or the like). Regarding post-attachment functions, the system may further include as a step of automatically analyzing a card-carrier attachment to validate whether each card is attached to the correct corresponding carrier. Moreover, post-attachment validation functions may be used to automatically analyze multiple card-carrier attachments simultaneously.

Figure 5:
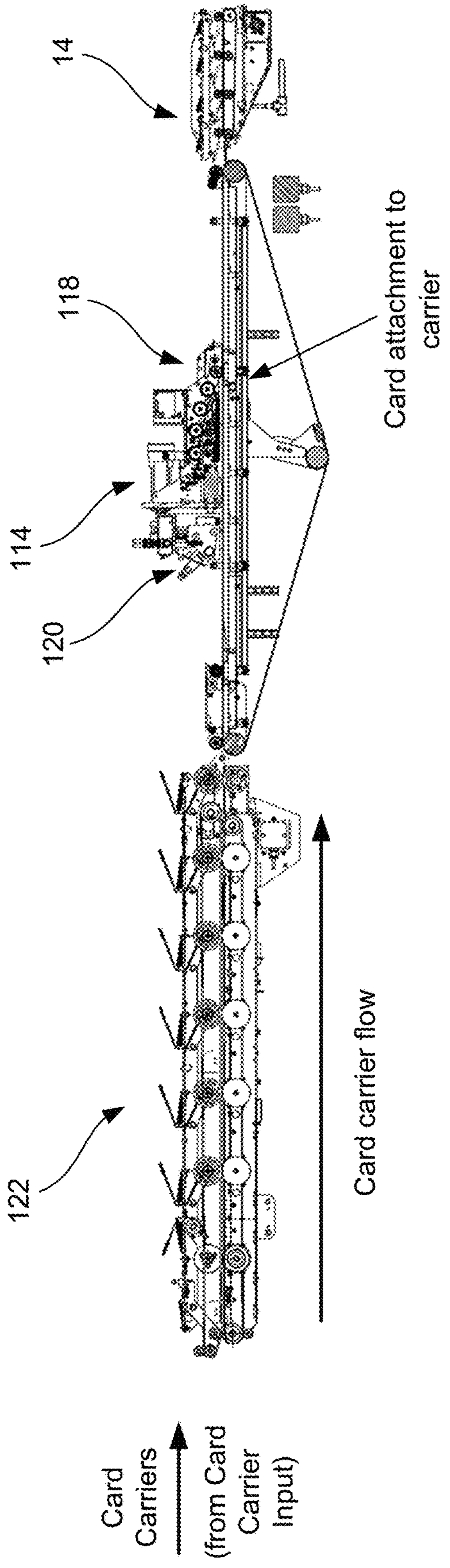
FIG. 5 is a side view of a card carrier transport module and a card placement module operably coupled to one another, wherein the card placement module is configured to receive, position, and place cards onto respective carriers transported via the card carrier transport module.

FIG. 5 is a side view of a card printer module 104 operably coupled to a refeed buffer module 110. As previously described herein, the card printer module 104 is configured to receive cards from the card feeder module 102. The cards may be transferred along a belt assembly, such as a vacuum transport belt or the like, and may subsequently pass through a photo sensor that initiates operation of the UV curable ink printer 106. After the cards are printed, the cards pass onto a second vacuum transport belt with ink that has not been cured yet. After a prescribed of amount of transport distance and time, the cards are then cured (e.g., cured under a UV LED cure module 108 in the case of UV curable ink). It should be noted that the time from the point of printing to the beginning of curing may be adjusted (e.g. the flow rate) to ensure optimal print quality. Similarly, the time under the curer, distance from the curer irradiation window to the card, and power of the LEDs may be adjusted as needed to thereby maintain quality of ink curing.

As previously described herein, WIP can be understood to be a number of cards, or any type of document, being processed by the system at any given time. In order to meet productivity requirements, the cards are fed at a specific rate and pitch. Given the length of the transport through the card printer module and subsequent modules, this places many cards in process at a given time. As such, one important goal of this system is to maximize the amount of WIP while still being able to handle unexpected issues on the system. For example, if too many cards/documents are in process when the system needs to stop, there can be an overrun or pile up of cards/documents, resulting in the system losing track of them.

Traditionally, this issue was solved by having a certain amount of parking positions or spots (also referred to as stopping positions or stops) per amount of WIP required. Such parking positions are created by adding an additional motor and (e.g., belt, roller, and/or nips) that can be controlled independently from the rest of the system. However, parking positions take up length and add costs to the overall system and process.

In order to effectively manage the WIP, without adding multiple parking positions, the system of the present invention can further make use of the refeed buffer module 110. The refeed buffer module is configured to received printed and cured cards from the card printer module and essentially functions by stacking the cards vertically, and then refeeding them back out for subsequent processing. Accordingly, during an unexpected stop of the system, upstream cards can be stacked in a hopper associated with the refeed buffer module. As such, the refeed buffer module is similar to the card feeder module, in that cards are singulated from a stack of cards. However, the card stack size in the refeed buffer module is much smaller than the initial loaded card stack in the hopper of the feeder module, and under normal steady state operation, the refeed buffer module is configured to maintain a constant number of cards at a given time.

Accordingly, the refeed buffer module is unique in that, during steady state operation, the refeed buffer module is able to acts as single nip/gate transport, and thus does not take up much length or space, but, during exception conditions, such as input latencies and complete stoppages, the WIP can be placed in the refeed buffer module hopper and refed back into the workflow upon resumed operation, thereby effectively managing the WIP. The alternative for holding an equivalent amount of cards would be to provide individual parking positions along the card path, which requires a longer card path, which can present system timing and floor space challenges. Buffer systems are described in U.S. Pat. Nos. 9,573,709, 6,687,570, and 6,687,569, each of which is incorporated by reference herein.

Figure 9:
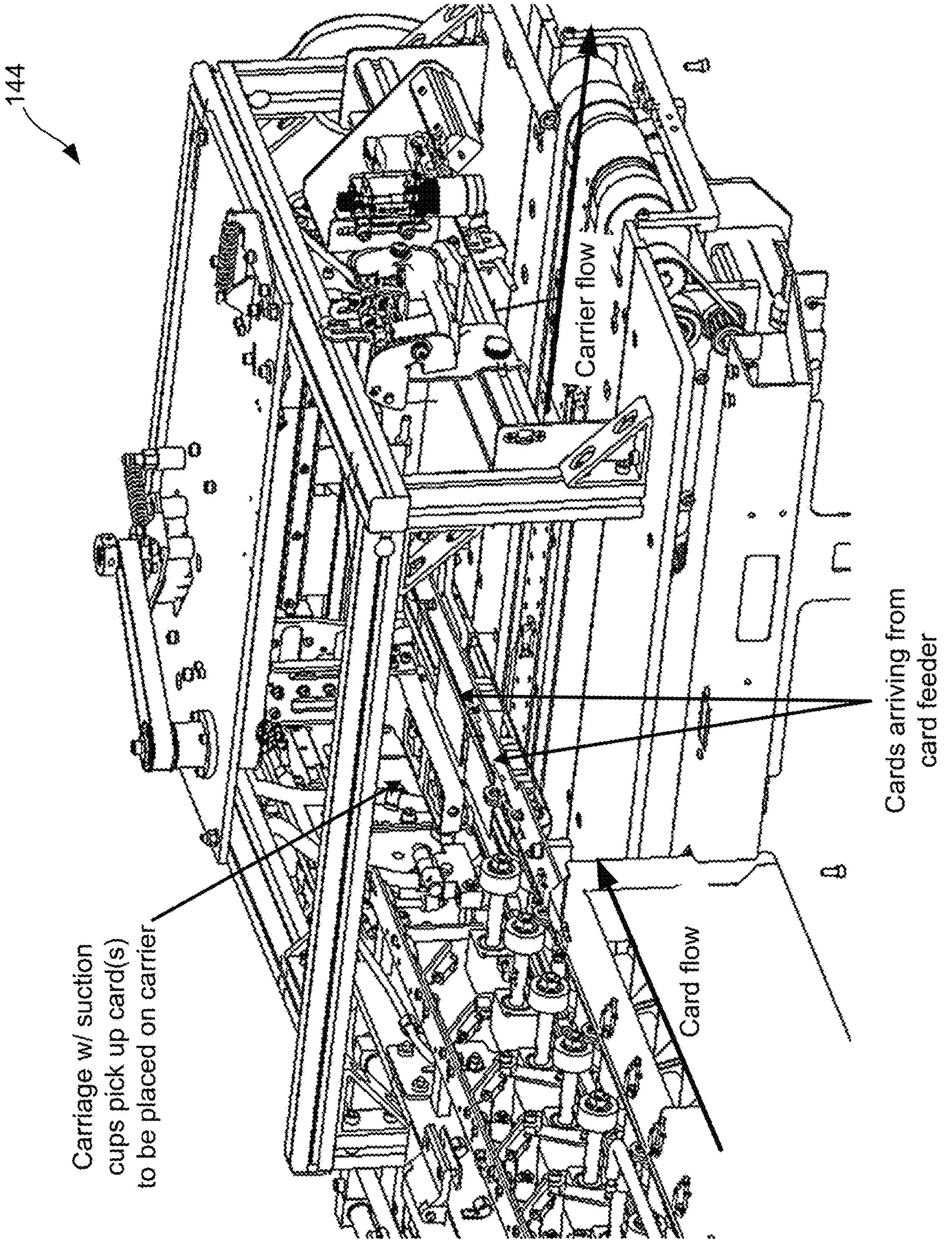
FIG. 9 is a perspective view of the PNP attachment module positioned relative to the card flow path and carrier flow path, such that the PNP attachment module can receive and transfer one or more cards from the card flow path onto respective carriers flowing along the carrier flow path.

FIG. 9 is a side view of a card carrier transport module 122 and a card placement module 114 operably coupled to one another, wherein the card placement module 114 is configured to receive, position, and place cards onto respective carriers transported via the card carrier transport module.

Figure 6A:
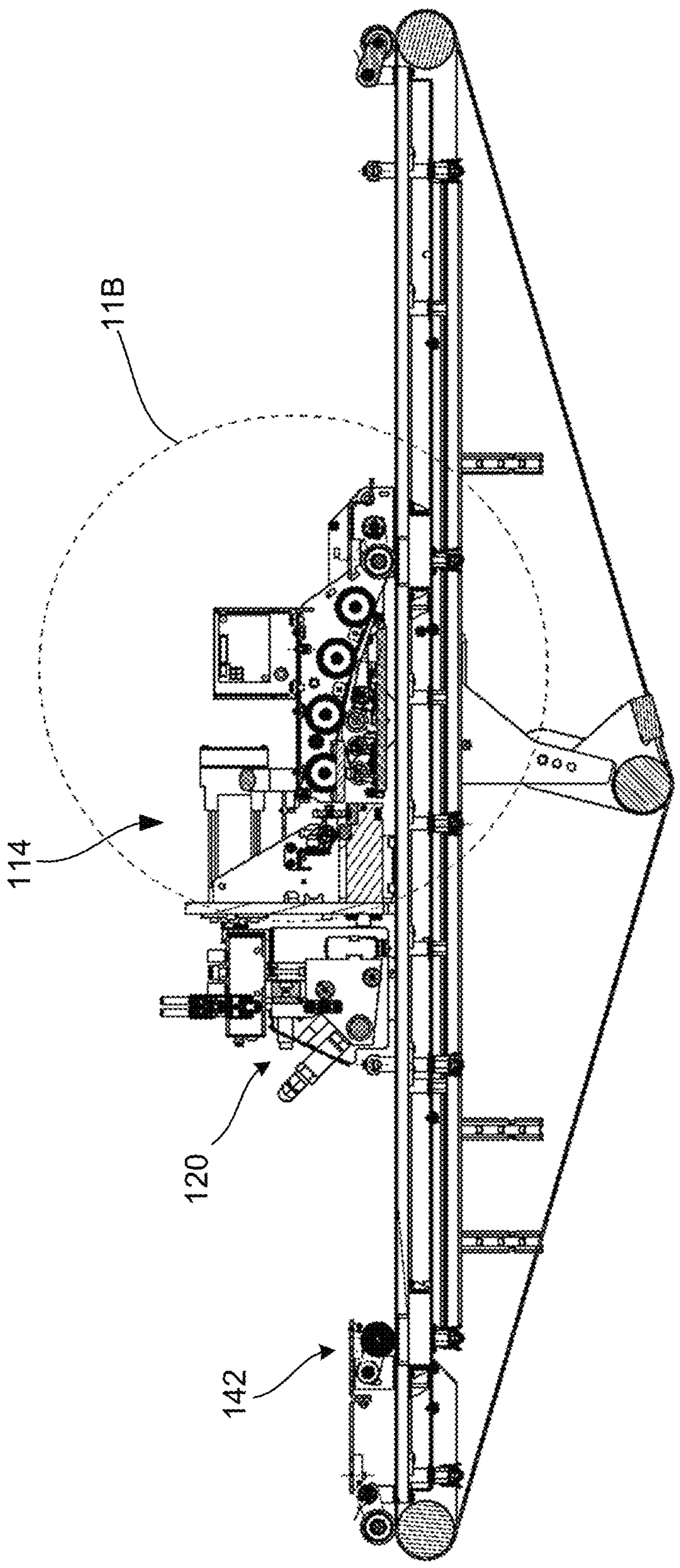
FIG. 6A is a side view of one embodiment of a card placement module, in the form of a right angle turn (RAT) attachment module, for positioning and placing cards onto respective carriers.
Figure 6B:
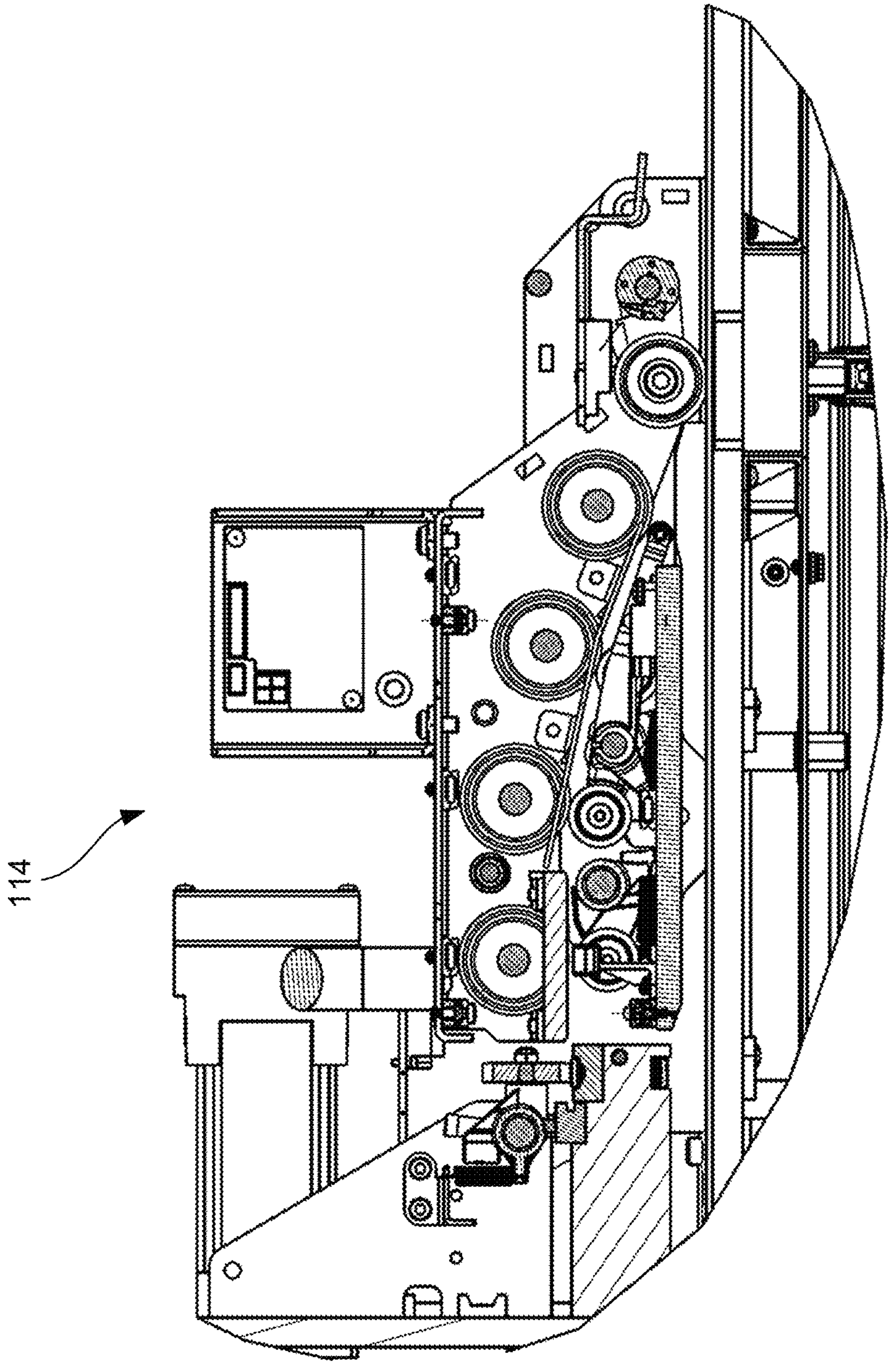
FIG. 6B is an enlarged side view of the card placement module of FIG. 6A in greater detail.

As previously described herein, one embodiment of a card placement module for use in the present system is a right angle turn (RAT) attachment module, which is depicted in FIGS. 5, 6A, and 6B. For example, FIG. 6A is a side view of one embodiment of a card placement module, in the form of RAT attachment module 114, for positioning and placing cards onto respective carriers. FIG. 6B is an enlarged side view of the RAT attachment module of FIG. 6A in greater detail.

Upon passing through the scan station module 112 and being validated, cards are then passed along to the RAT attachment module 114 for positioning and placing one or more cards onto a carrier. In particular, the RAT attachment module 114 is configured to divert the flow of the cards in a second direction (i.e., diverted at a right angle turn) to be perpendicular to the first card flow direction. For example, after scanning, additional staging gates may be used as parking locations and to set the correct card pitch prior to entering the RAT attachment module 114. For example, one or more staging gates may be used when running two cards through the assembly for attachment to one carrier. This may be used to adjust the spacing of two cards prior to entering the right angle turn pathway. The final spacing of the two cards in the right angle turn pathway may dictate how the cards are presented and attached to the carrier.

The RAT attachment module 114 consists of two card paths, an input path and an exit path, they are set 90 degrees apart. The two card paths may be used to bring in cards in from the card input leg and to set the placement location and spacing for how they will be presented to the carrier. The two card paths may also be used to change card travel direction from the input card path to the outgoing card path (i.e. the first flow direction to the second flow direction). For example, the cards may be made to make a right angle turn via a set of alternating retractable nips. As the cards enter the right angle turn, they are placed in the appropriate location for transport down to the carrier. Once the cards are stopped, a set of retractable nips in the card input path open up, while simultaneously another set of retractable nips in the card output path are made to close. In this manner, the cards are always in one set of nips and control is never lost. The two card paths may also be used to transport cards down to the carrier and then tipped 118 (placed on the carrier by merging the card with the carrier at speed). It should be noted that the RAT attachment module provides a great degree of card placement flexibility, in that, while the actuated nips are in fixed positions, such positions of the actuated nips can be adjusted (i.e., via programming from the user interface 32 and control system 34) so as to vary the number and location of cards presented for attaching to a given carrier. Accordingly, by simply utilizing the single card feeder module 102 in combination with the RAT attachment module, the number and location of cards attached to a given carrier can be customized depending on the particular project.

Figure 7A:
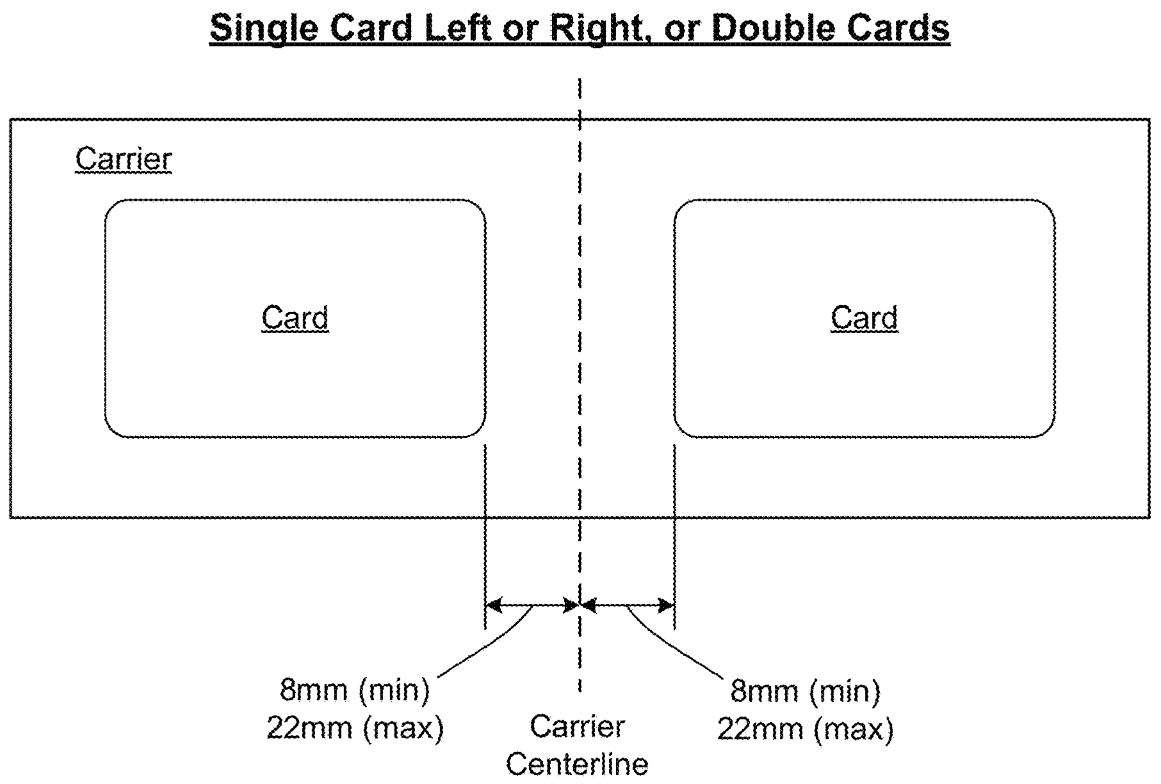
FIGS. 7A and 7B are plan views illustrating the flexibility of using a RAT module for placing one or more cards onto a given carrier, including flexibility of placing a single card on the left or right sides of a carrier relative to a center line of the carrier (or placement of two cards on either side of the centerline of the carrier) (see FIG. 7A) and flexibility of placing a single card on a carrier relative to the centerline of the carrier (see FIG. 7B).
Figure 7B:
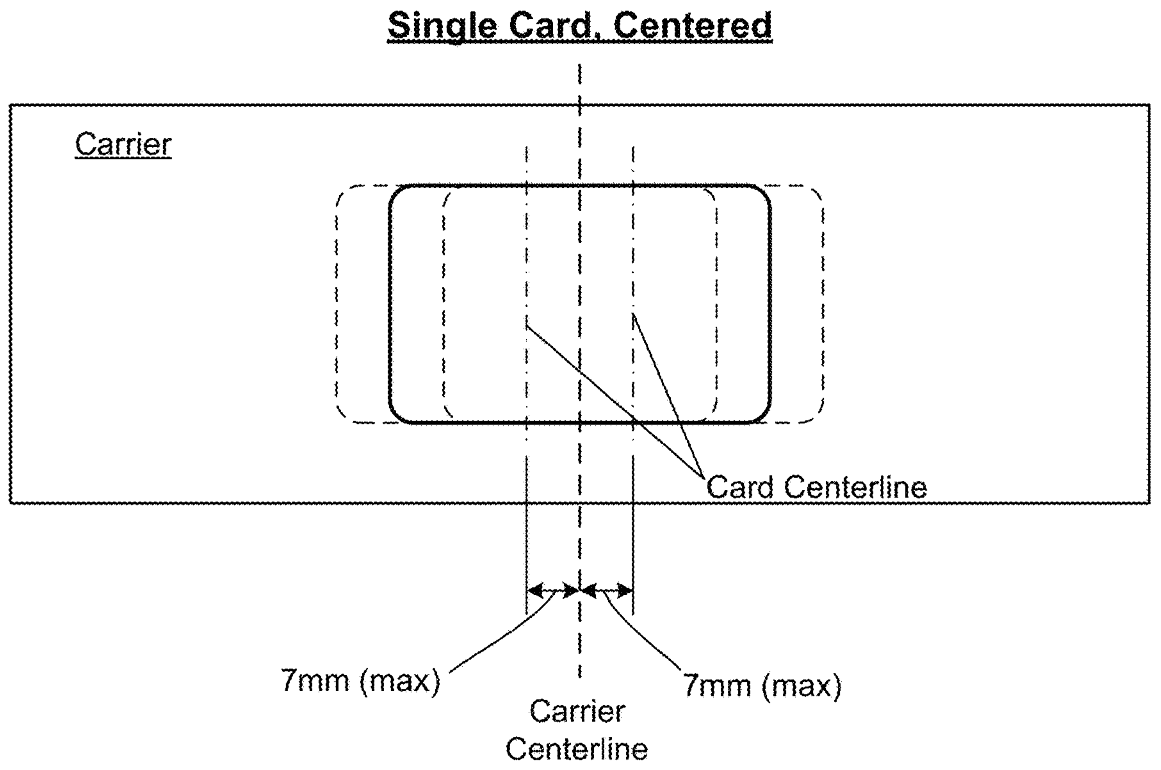

FIGS. 7A and 7B are plan views illustrating the flexibility of using a RAT module for placing one or more cards onto a given carrier, including flexibility of placing a single card on the left or right sides of a carrier relative to a center line of the carrier (or placement of two cards on either side of the centerline of the carrier) (see FIG. 7A) and flexibility of placing a single card on a carrier relative to the centerline of the carrier (see FIG. 7B). For example, the two card paths (input path and exit path) of the RAT attachment module 114 allow for bringing in cards in from the card input leg and to set the placement location and spacing for how the cards will be presented to the carrier, allowing for card placement flexibility with some constraints. For example, a single card can be placed in the middle of the carrier+7 mm from then center (see FIG. 7B) or on either side of center at a location of 8 mm (min) to 22 mm (max) from center as measured to the inside edge of the card (see FIG. 7A), or two cards can be placed, one on each side of center at a location of 8 mm (min) to 22 mm (max) from center as measured to the inside edge of the card (see FIG. 7A).

It should be noted that, in other embodiments, the card placement module may include a pick and place (PNP) attachment module 144 in place of a RAT attachment module 114. In particular, once scanned and validated, cards may be attached to carriers via the PNP attachment module 144 without first diverting the cards in the second direction, as would occur with the RAT attachment module 114.

Figure 8:
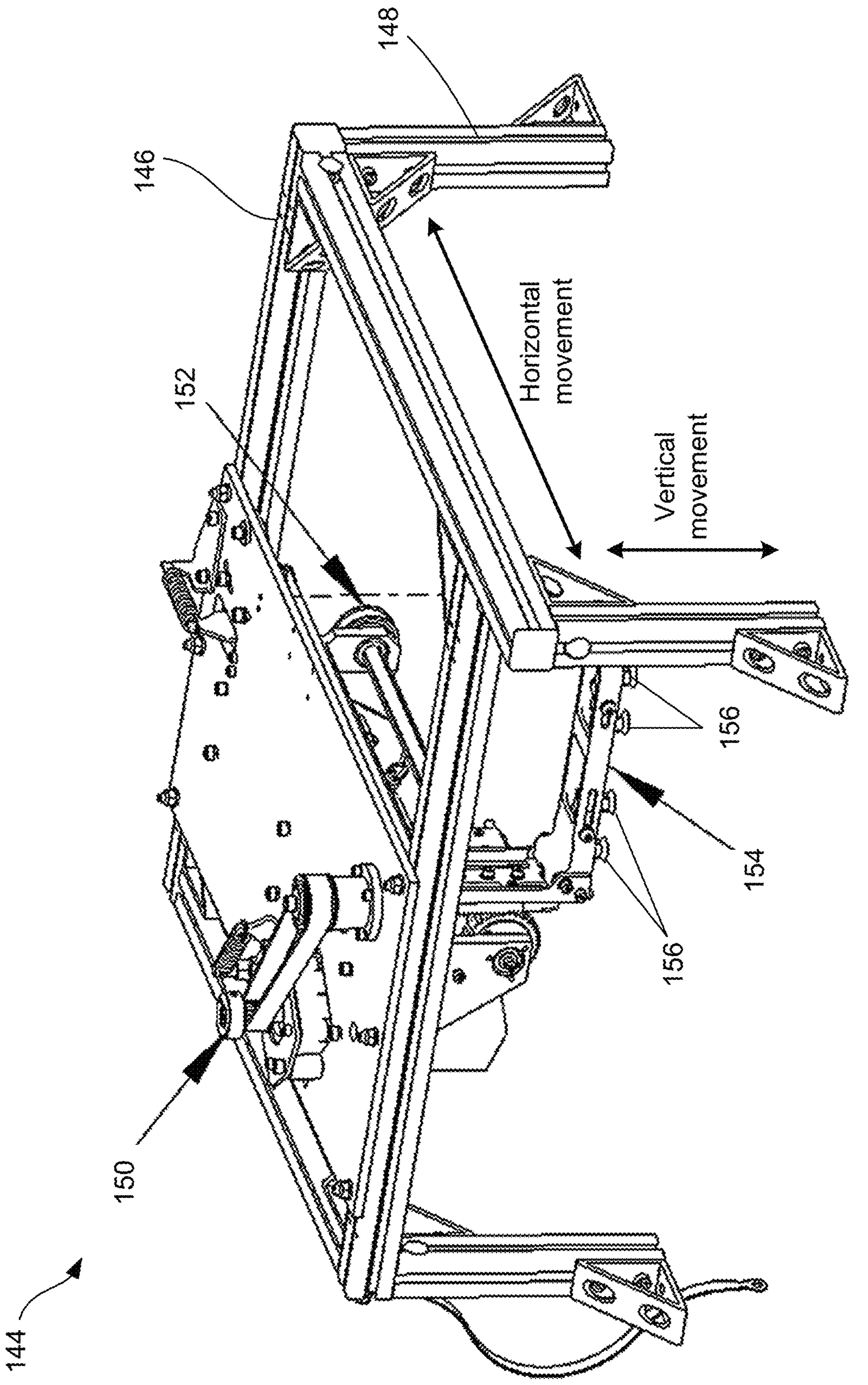
FIG. 8 is a perspective view of another embodiment of a card placement module, in the form of a pick and place (PNP) attachment module for positioning and placing cards onto respective carriers.
Figure 10A:
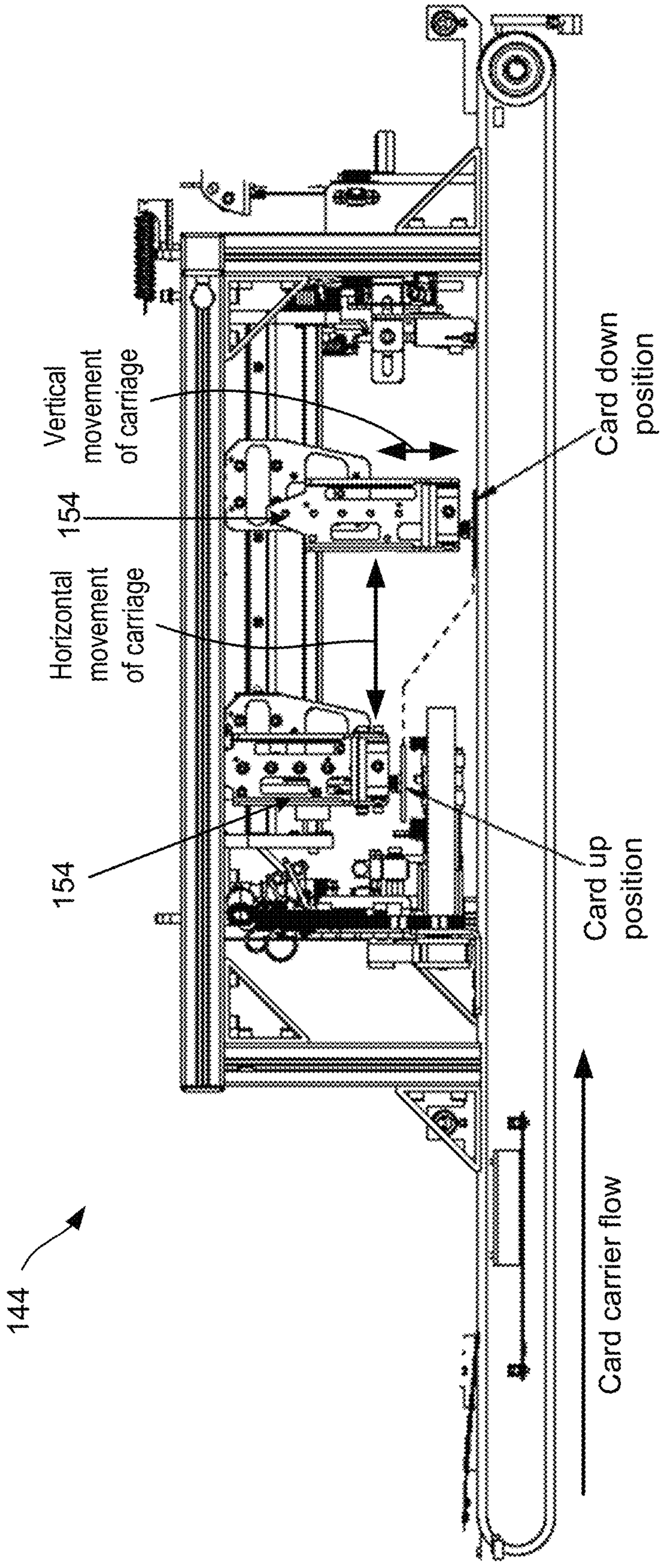
FIGS. 10A and 10B are side and plan views, respectively, of the PNP attachment module illustrating operation thereof (i.e., picking up one or more cards, positioning the one or more cards relative to a respective carrier, and placing the one or more cards onto the respective carrier.
Figure 10B:
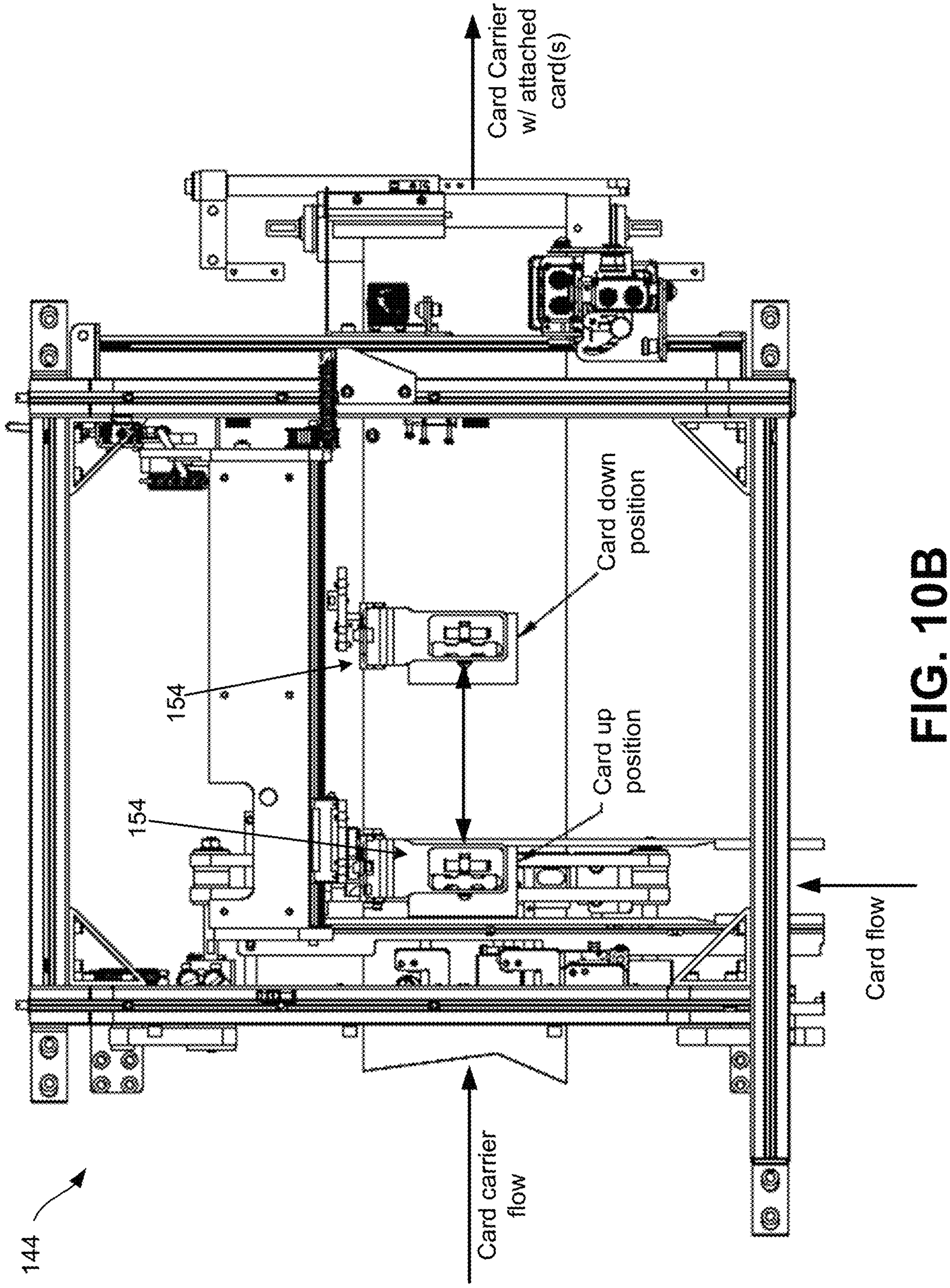

For example, FIG. 8 is a perspective view of a PNP attachment module 144 for positioning and placing cards onto respective carriers. FIG. 9 is a perspective view of the PNP attachment module 144 positioned relative to the card flow path and carrier flow path, such that the PNP attachment module 144 can receive and transfer one or more cards from the card flow path onto respective carriers flowing along the carrier flow path. FIGS. 10A and 10B are side and plan views, respectively, of the PNP attachment module 144 illustrating operation thereof (i.e., picking up one or more cards, positioning the one or more cards relative to a respective carrier, and placing the one or more cards onto the respective carrier.

As shown, the PNP attachment module 144 generally includes a frame 146 and legs 148 for supporting a moveable carriage 154 comprising sets of suction cups 156 configured to lift and release one or more cards at a time for subsequent positioning and placement of the cards onto carriers. In particular, the PNP attachment module 144 may be mounted relative to the card carrier transport module (see FIG. 9), such that carriers are transported and flow underneath the carriage of the PNP attachment module 144.

The PNP attachment module 144 is equipped with a 2-axis actuator, in that the carriage 154 can be moved horizontally and vertically relative to carriers via independently controlled actuators 150 and 152. Accordingly, the PNP attachment module 144 may use suction, from suction cups or a low-strength vacuum, to pick up one or more cards from the card stream, then move in a horizontal direction to align the one or more cards with a given carrier and move in a vertical direction to place the one or more aligned cards onto a carrier at speed.

For placement consistency in the staging area, the cards may be positioned against an adjustable back stop on the feeder. To assure the cards properly align against the back stop, the transport belts may be accompanied by a low-strength vacuum to hold the cards and/or carriers in place on the backstops.

Referring specifically to FIG. 9, after cards arrive in the module 144, the cards are held at a backstop on the card stream belt. The carriage 154, with suction cups 156, travels down to the card. At the same time, a control valve turns on to supply air to a low-strength vacuum along the card stream, which provides the stable backstop for the carriage to grab the card without altering the cards orientation. As soon as the suction cups 156 of the carriage 154 touch the cards and acquire them, the motion of the carriage reverses, thereby lifting the cards. At the same time, the horizontal actuator 150 starts accelerating the carriage 154 (and thereby the suctioned card or cards) towards the carrier stream to be positioned and placed on the carrier. After the carriage clears the card stream area, the vertical actuator 152 brings the carriage 154 down to the carrier stream, shown below the card stream. The carrier stream moves carriers from the top left of the figure along the lower belts of the PNP attachment module 144 towards the bottom right of the figure. Prior to the moment when the card would touch the carrier, the horizontal velocity of the carriage matches the velocity of the carriers along the carrier stream to provide precise card-carrier alignment. After contact, a control turns off a vacuum holding the carrier along the carrier stream, but keeps the velocities matched for a short time to ensure precise placement of the card on the carrier along the carrier stream. The carriage 154 is then actuated vertically and ascends, losing contact with the card, now attached to the carrier. The carriage then returns to its original position on the PNP attachment module 144 to being card acquisition.

FIGS. 10A and 10B are side and plan views, respectively, of the PNP attachment module 144. As shown, the carrier moves horizontally from the card-up position, where the carriage picks up the card, to the second card-down position, where the card is affixed to the carrier located on a separate stream below the card stream. The carrier stream may move perpendicular or parallel to the card stream. In preferred embodiments, the carrier stream moves perpendicular to the card stream for attachment by the PNP. After the carrier exits the vacuum carrier transport, it will pass onto the rest of the system. Depending on the specific configuration, it will either enter a card folding module or buffer transport.

Figure 11:
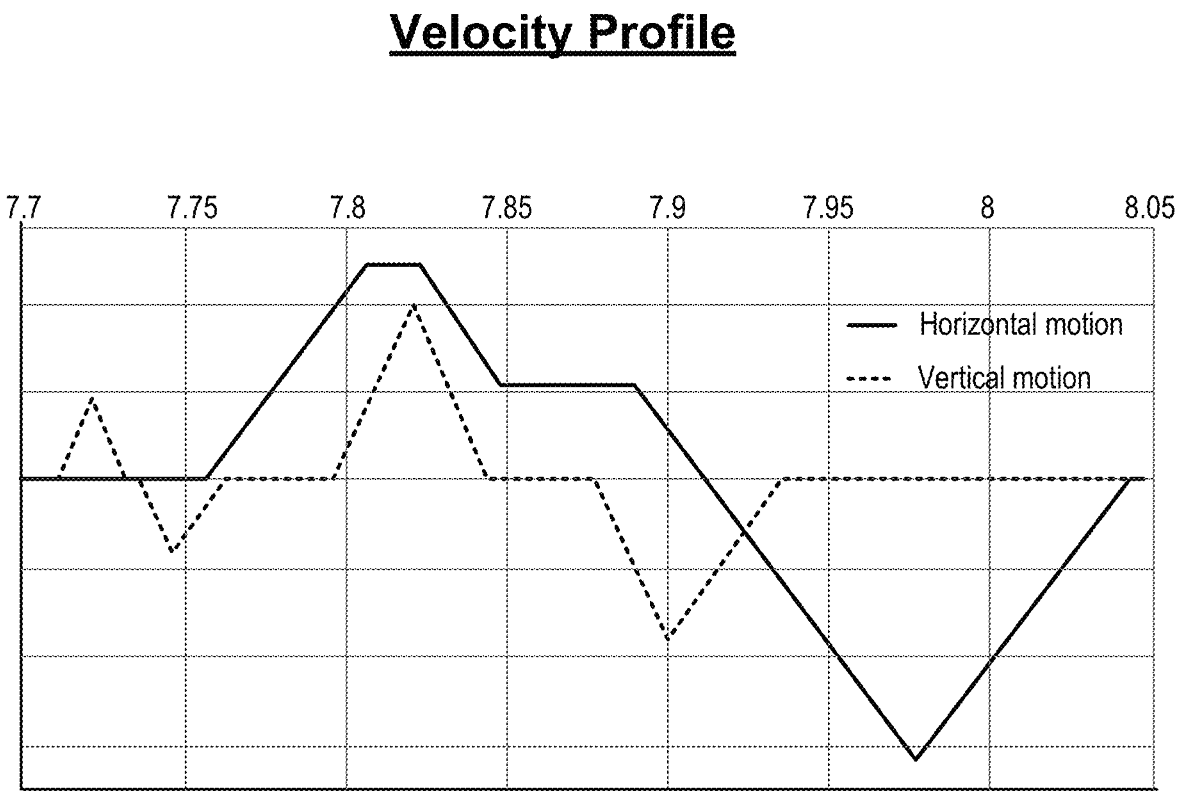
FIG. 11 shows a timing diagram and associated mechanism velocity profiles associated with the horizontal and vertical motions of the PNP attachment module during operation thereof.

FIG. 11 shows a timing diagram and associated mechanism velocity profiles associated with the horizontal and vertical motions of the PNP attachment module during operation thereof.

Aspects of the invention may further comprise additional modules for performing certain functions, including pre-attachment and post-attachment functions. For example, the system of the present invention may include a module for applying labels to cards prior to attachment of the cards to carriers. The labels may be directly applied to the cards and provide information related to the card (i.e., security information, instructions for activating a card, or the like). Regarding post-attachment functions, the system may further include as a step of automatically analyzing a card-carrier attachment to validate whether each card is attached to the correct corresponding carrier. Moreover, post-attachment validation functions may be used to automatically analyze multiple card-carrier attachments simultaneously.

Accordingly, the system of the present invention provides numerous advantages. For example, by operably coupling a plurality of individual modules to one another, each having a specific function, a single system is achieved, thereby improving the overall throughput and mailpiece integrity, while reducing errors and system inefficiencies. Such modules provide various functions in the workflow, and associated benefits, including, but not limited to, controlled feeding of cards into the system via a card input path, printing on said cards, buffering said cards to handle errors without the need to necessarily stop the system workflow, scanning of cards for authentication purposes and to identify errors, and subsequent positioning and placing of cards onto respective carriers. Furthermore, the modularity of the system allows for the addition and subtraction of certain modules as an operator sees fit without necessarily impacting the overall system performance.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Incorporation by Reference

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A modular card processing and attaching system configured to provide an uninterrupted process for feeding and attaching cards to corresponding carriers, the system comprising:

a card feeder module configured to receive and feed a plurality of cards into a card flow pathway in a singulated fashion and in a first direction; and a card placement module configured to receive one or more of the plurality of cards from the card feeder module and automatically position and attach, via an adhesive, the one or more cards to a corresponding carrier of a plurality of carriers traveling within a carrier flow pathway in a second direction.

2. The system of claim 1, wherein the card flow pathway and the carrier flow pathway are oriented substantially perpendicular to one another.

3. The system of claim 2, wherein the card placement module is configured to reposition the one or more cards received from the card feeder module such that each card is substantially parallel the carrier flow pathway upon which a corresponding carrier is traveling and in a predefined arrangement relative to the carrier.

4. The system of claim 3, wherein the card placement module comprises a right angle turn (RAT) attachment module.

5. The system of claim 4, wherein the RAT attachment module is configured to position and attach one or more cards to a single carrier in a predefined arrangement.

6. The system of claim 5, wherein the RAT attachment module is configured to position and attachment at least two cards to a single carrier in a predefined arrangement.

7. The system of claim 4, wherein, upon positioning the one or more cards relative to a carrier and in a predefined arrangement, the RAT attachment module is configured to place the one or more cards onto respective portions of a carrier comprising an adhesive, thereby merging the card with the carrier at speed.

8. The system of claim 7, wherein the RAT attachment module provides a card tipping pathway allowing for tipping of the one or more cards onto the respective adhesive portions of the carrier to thereby attach the one or more cards with the carrier at speed.

9. The system of claim 1, wherein the adhesive comprises glue or adhesive tape.

10. The system of claim 9, further comprising an adhesive application module configured to apply adhesive to the plurality of carriers prior to placement of one or more cards thereupon via the card placement module.

11. A modular card processing and attaching system configured to provide an uninterrupted process for feeding, printing, and attaching cards to corresponding carriers, the system comprising:

a card feeder module configured to receive and feed a plurality of cards into a card flow pathway in a singulated fashion and in a first direction;

a card printer module configured to receive the plurality of cards from the card feeder module and subsequently print information on one or more of the plurality of cards;

a refeed buffer module operably associated with the card printer module and configured to operate in a first mode associated with a normal steady state operation of the system and a second mode associated with exception conditions; and a card placement module configured to receive one or more of the plurality of cards initially fed from the card feeder module and automatically position and attach, via an adhesive, the one or more cards to a corresponding carrier of a plurality of carriers traveling within a carrier flow pathway in a second direction.

12. The system of claim 11, wherein the card printer module comprises an ink printer.

13. The system of claim 12, wherein the ink comprises ultraviolet (UV) curable ink.

14. The system of claim 13, wherein the card printer module further comprises a curing module to cure the ink, the curing module comprising a UV light such that each printed card is exposed to the UV light of the curing module.

15. The system of claim 11, wherein:

when in the first mode, the refeed buffer module is configured to function as a single nip/gate transport for allowing cards to pass therethrough and towards the scanning module; and when in the second mode, the refeed buffer module is configured to receive and retain work in process (WIC) related printed cards within an associated hopper and subsequently refeed such WIC related printed cards into the card flow pathway upon the exception conditions being addressed and the system returning to a normal steady state operation.

16. The system of claim 11, wherein the card flow pathway and the carrier flow pathway are oriented substantially perpendicular to one another and the card placement module is configured to reposition the one or more cards received from the card feeder module such that each card is substantially parallel the carrier flow pathway upon which a corresponding carrier is traveling and in a predefined arrangement relative to the carrier.

17. The system of claim 16, wherein the card placement module comprises a right angle turn (RAT) attachment module.

18. The system of claim 11, further comprising a scanning module configured to scan printed information on each card to at least identify a corresponding carrier to which each card is to be attached.

19. The system of claim 18, scanning module configured to scan the printed information on each card to identify any errors present.

20. The system of claim 11, further comprising an outsort module for receiving removed cards identified as having one or more errors.

* * * * *